May 9, 1939.   J. P. BURKE   2,158,029
WIRE CONNECTOR
Filed Dec. 19, 1938
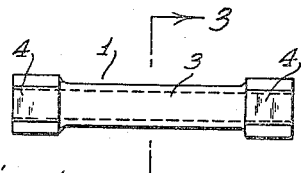
Fig.1.
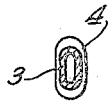
Fig.3.
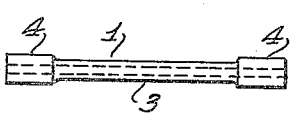
Fig.2.
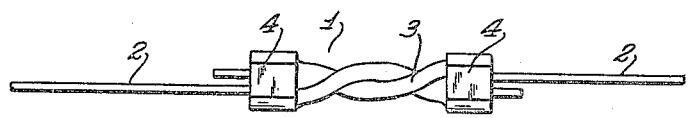
Fig.4.
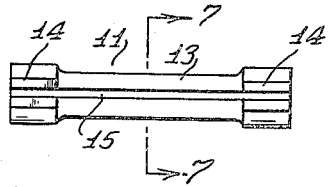
Fig.5.
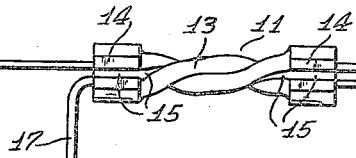
Fig.7.
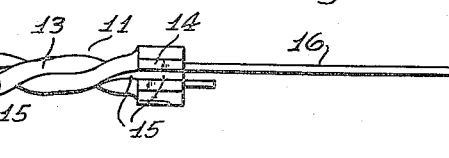
Fig.6.
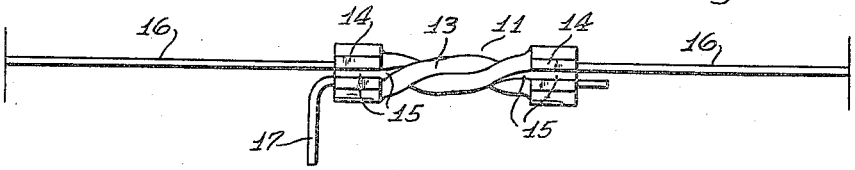
Fig.8.
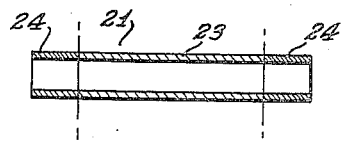
Fig.9.
Fig.11.
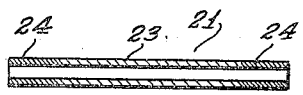
Fig.10.
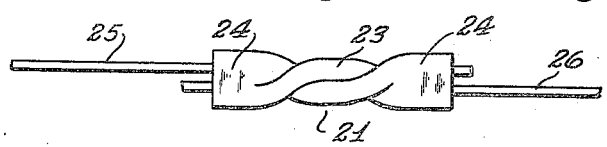
Fig.12.
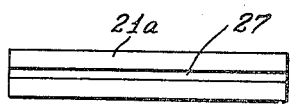
Fig.13.
INVENTOR.
James P. Burke
BY
ATTORNEY.

Patented May 9, 1939

2,158,029

UNITED STATES PATENT OFFICE 2,158,029

WIRE CONNECTOR

James P. Burke, Knoxville, Tenn., assignor to F. L. McLaughlin, Detroit, Mich.

Application December 19, 1938, Serial No. 246,648

1 Claim. (Cl. 287—78)

This invention relates to means for connecting or uniting wires, cables and the like, one with another, and has for its primary object to provide inexpensive means adapted to form a durable connection between the elements to be united.

Connecting means of the type here contemplated comprises a tube of oblong cross section adapted to be twisted about wires or similar contained elements to frictionally bind said elements together. Broadly defined, tubular elements of oblong section have heretofore been used for this purpose, and this invention has for another object to improve said prior elements by eliminating certain defects which rendered universal use thereof impractical.

In using the type of connecting tubes here contemplated the wires or elements to be connected are inserted therein, tools are applied to the ends of the tube, and the tube is twisted, causing the wires to twist one about another, and causing distortion of the metal of the tube in such manner as to firmly bind the wires together. With a tube of uniform strength throughout its entire length the main distortions take place immediately adjacent the tools, with the result that an attempt to twist the tube throughout its entire length results in shearing off the tool engaged ends thereof. Another object of this invention is to teach the construction of tubes that may be uniformly twisted throughout their entire length, with exception of the tool engaged portions, without severing the tool engaged portions from the remainder thereof.

Another object is to teach alternative means for reinforcing the tool engaged ends of a tube type connector. For example, the tube may be formed with end portions, adapted for engagement by tools, which are substantially heavier than the portions intended to be distorted, or alternatively, said end portions may be formed of metal having a greater resistance to distortion or bending than the portion intended for distortion. The method of obtaining such conditions is described and claimed in my co-pending application Serial No. 246,649, filed December 19, 1938.

Tube type connectors of the type heretofore known are used by inserting the two wires or like elements to be joined in opposite ends thereof, and are incapable of use for the purpose of connecting one wire end to a wire having its ends supported or secured to other objects. This invention has as a further object to provide a connector of this character by means of which a wire or like element may be connected to another wire or like element at points spaced from the ends thereof in which the wires are insertable laterally or radially thereof. In this respect the tube is slotted throughout its entire length in order that it may be placed on a wire by passage of the wire through the slot, and the other wire end to be secured thereto may be inserted through an end thereof in the usual manner.

Another object is to provide a slotted tube for the purpose above mentioned, with the slot in said tube disposed in such relationship to the sectional configuration of the tube that the slot is closed when the tube is distorted.

Other objects and advantages will become more fully apparent as reference is had to the accompanying drawing wherein my invention is illustrated, and in which:

Figs. 1 and 2 are elevations of a connector;

Fig. 3 is a section taken on the line 3—3 of Fig. 1;

Fig. 4 is an elevation illustrating the connector distorted and connecting two wires together;

Figs. 5 and 6 are elevations of a slotted connector;

Fig. 7 is a section taken on the line 7—7 of Fig. 5;

Fig. 8 is an elevation of a slotted connector distorted and connecting a tapwire with a main wire;

Figs. 9 and 10 are longitudinal sections illustrating a connector having hardened ends;

Fig. 11 is an end elevation thereof;

Fig. 12 is a view illustrating the connection of two wires by the tube having hardened ends, and Fig. 13 illustrates a slotted tube having hardened ends.

Referring to Figs. 1 to 4, I designates a metal tube of substantially oblong section, with the opening therein proportioned to receive the ends of two wires 2. The ends of the wires 2 are inserted through the tube from opposite ends thereof and after they are drawn taut suitable tools are applied to the ends of the tube and the latter is twisted as illustrated in Fig. 4.

In order to provide for uniform distortion of the central portion 3 the ends 4 are formed of metal substantially heavier than the portion 3, and said ends 4 are flattened for engagement by the twisting tools. The reinforced or heavier end portions, in addition to confining distortion to the central portion 3, make it possible to apply sufficient twisting pressure on the ends of the tube to draw the metal of the tube tight about the wires, without complete or even partial severance of said ends.

Referring to Figs. 5 to 8, the connector is similar to that above described in that it comprises a flattened tube 11 having a central portion 13 subject to distortion and comparatively heavy end portions 14 for engagement by a tool. The tube 11 is slotted throughout its entire length, with the slot 15 disposed parallel to its axis, and in one of the flattened side walls. In use, the sleeve 11 is placed on the long wire 16 by passage of the wire through the slot 15, and the tap wire 17 has its end inserted through the end of the tube. The tube is then twisted by pressure applied by tools engaging the ends 14 thereof.

The connector shown in Figs. 9 to 12 comprises a tube 21 of oblong section having a central portion 23 susceptible to distortion and end portions 24 which are less susceptible to distortion. This condition may be obtained by annealing the central portion 23 to render the metal thereof softer than the end portions 24.

When the two wire ends 25 and 26 are inserted in the tube 21, tools are applied to the ends thereof and the tube is twisted. As shown in Fig. 13, the tube may be slotted similar to the tube 21a having the longitudinal slot 27, to permit connection of a tap wire to a main wire which cannot be inserted through the ends of the sleeve.

The connector above described is adapted for use in connecting electric wires, as well as for many other uses, and it will be apparent, of course, that the term "wire" is here used for convenience in describing any of a multiplicity of analagous elements.

Although specific embodiments of the invention have been illustrated and described, it will be understood that various changes may be made within the scope of the appended claim without departing from the spirit of the invention, and such changes are contemplated.

What is claimed is:

A sleeve adapted to be twisted with contained flexible elements having thickened ends of substantially uniform cross-section and a mid-portion of substantially uniform cross-section throughout its length, said ends converging into said mid-portion by a fillet-like portion for preventing fracture of said mid-portion at the juncture with said ends, said thickened ends being resistant to distortion by twisting tools whereby torsional deformation is confined to said mid-portion.

JAMES P. BURKE.